United States Patent [19]

Watanabe et al.

[11] 4,011,075

[45] Mar. 8, 1977

[54] MATERIALS FOR TAMPING BATTERY MIX

[75] Inventors: Misao Watanabe, Nikko; Yasuji Fujii, Yokohama; Kiyoshi Takayanagi, Tokyo, all of Japan

[73] Assignee: The Furukawa Electric Co., Ltd., Tokyo, Japan

[22] Filed: Aug. 19, 1974

[21] Appl. No.: 498,616

Related U.S. Application Data

[63] Continuation-in-part of Ser. No. 271,517, July 13, 1972, abandoned.

[30] Foreign Application Priority Data

July 16, 1971  Japan .............................. 46-52862

[52] U.S. Cl. ............................. 75/171; 75/134 F; 75/170; 75/175.5; 249/135
[51] Int. Cl.$^2$ ................ C22C 19/05; C22C 19/07; C22C 14/00
[58] Field of Search ......... 75/134 R, 134 N, 134 F, 75/135, 170, 171, 175.5; 148/11.5, 31.5, 32; 249/135

[56] References Cited

UNITED STATES PATENTS

| | | | |
|---|---|---|---|
| 3,063,835 | 11/1962 | Stern | 75/175.5 |
| 3,074,829 | 1/1963 | Novy et al. | 148/31.5 |
| 3,558,369 | 1/1971 | Wang et al. | 148/11.5 |
| 3,589,894 | 6/1971 | Roush | 75/171 |
| 3,622,234 | 11/1971 | Seybolt et al. | 75/170 |
| 3,660,082 | 5/1972 | Negishi et al. | 75/134 |
| 3,832,243 | 8/1974 | Donkersloot et al. | 148/32 |

FOREIGN PATENTS OR APPLICATIONS 7,002,632  8/1971  Netherlands ........................ 148/32

OTHER PUBLICATIONS

NOLTR 64–235, "Effects of Alloying upon Certain Properties of 55.1 Nitinol," May 28, 1965, pp. 1–5 & 9–16.

*Primary Examiner*—C. Lovell
*Attorney, Agent, or Firm*—Toren, McGeady and Stanger

[57] ABSTRACT

Materials for tamping battery mix, composed of an intermetallic compound of CoTi or Co-Ti binary alloy having a composition near the intermetallic compound or composed of the intermetallic compound in which part of the constituents are replaced by other elements and having excellent wear resistance and burning resistance as well as corrosion resistance against the battery mix.

6 Claims, 2 Drawing Figures

MATERIALS FOR TAMPING BATTERY MIX

CROSS REFERENCE TO RELATED APPLICATION

This application is a continuation-in-part of co-pending application Ser. No. 271,517, filed on July 13, 1972, now abandoned, the contents of which are incorporated herein by reference.

BACKGROUND OF THE INVENTION a. Field of the Invention

The invention pertains to the field of tampers for corrosive battery mixes and alloys possessing excellent corrosion.

b. Description of the Prior Art

In the dry battery industry, it is a common practice to tamp a powder mixture of manganese dioxide, graphite, ammonium chloride, zinc chloride, etc., as the battery mix into various shapes. However, the mixture is strongly corrosive, therefore ordinary metals cannot be used for this purpose.

In the past, ceramics were chiefly used for the purpose, however they are easily broken by impacts and special care was required for their handling.

Then Stellite No. 4 alloy was developed as an alloy for overcoming the corrosion and wear problems and has been used as tamping devices, such as, powder boxes, various dry battery tamping molds, holders, sleeves and extrusion dies for small batteries. However, Stellite No. 4 is available only in the cast form and it is impossible to obtain a uniform composition due to segregation and the variation in the quality on a lot by lot basis is large. Further, its length of service is, at best, only one and a half months.

SUMMARY OF THE INVENTION

Figure 1:
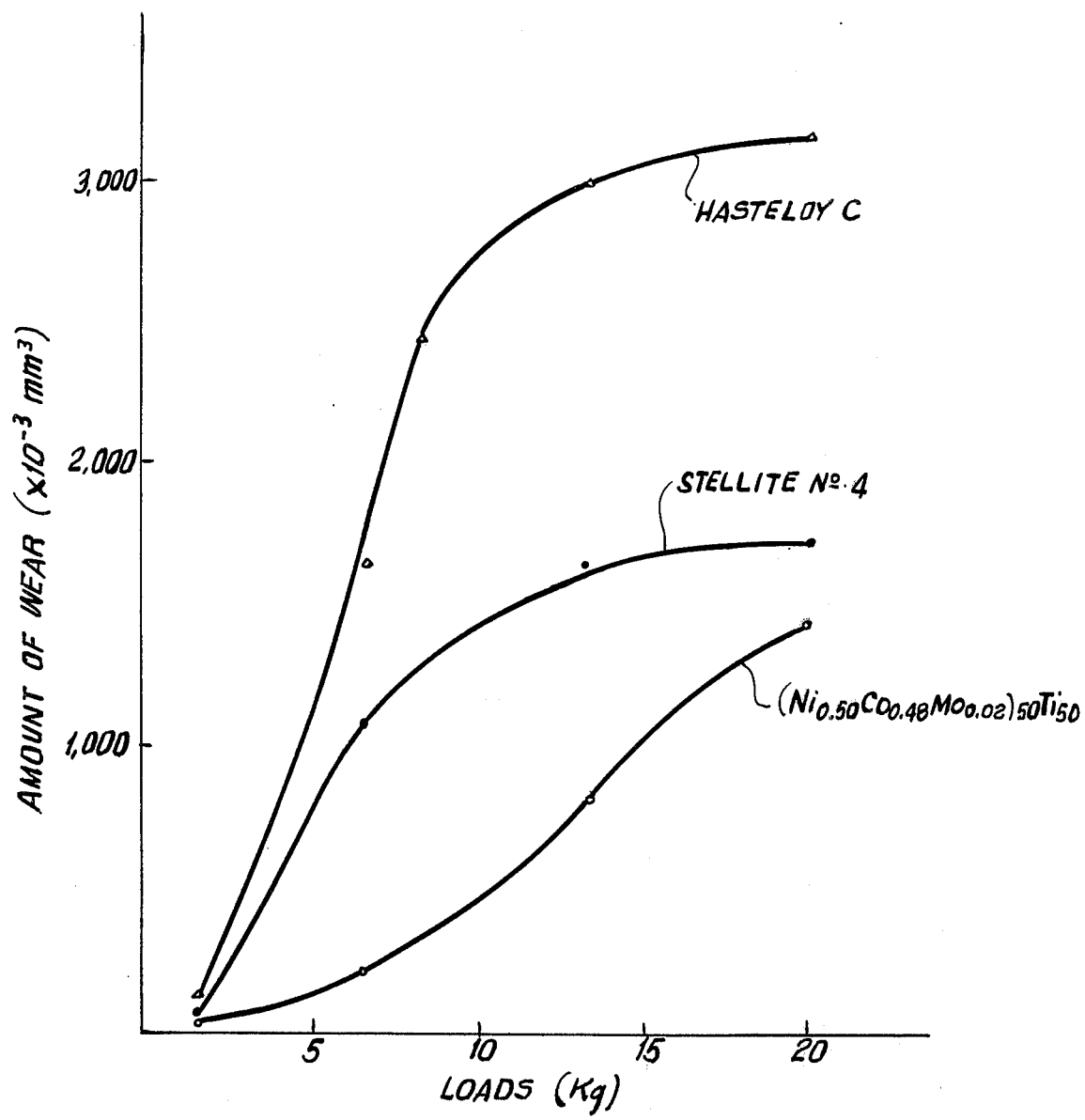
FIG. 1 is a graph of the wear characteristics of certain alloys.
Figure 2:
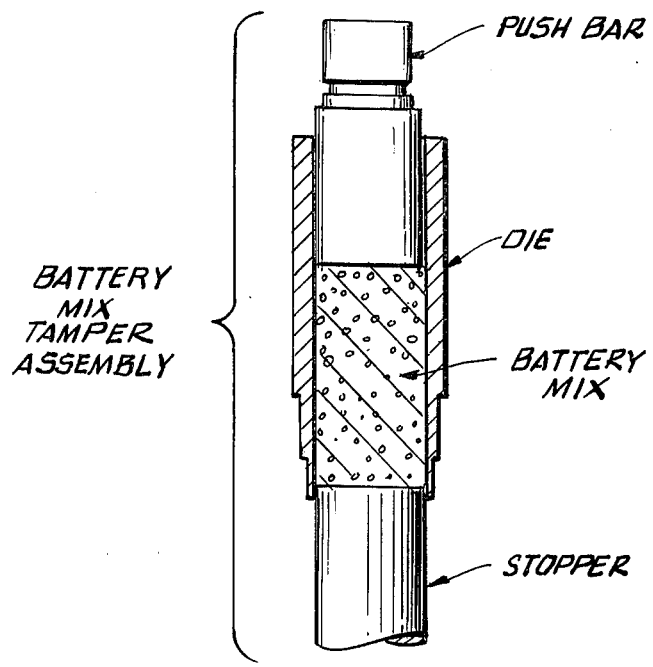
FIG. 2 is a view of a battery tamper in accordance with the present invention.

The present invention relates to materials for tamping battery mix, composed of an intermetallic compound comprising about 60 to 40 atomic % of titanium, about 0.5 to 5 atomic % of molybdenum, with the balance being Co, in which part of the constituents are replaced by other elements and having excellent wear resistance and burning resistance as well as corrosion resistance against the battery mix.

One of the objects of the present invention is to provide novel tamping materials which overcome the above problems, and to improve the corrosion resistance, wear resistance and erosion resistance against the battery mix as above mentioned.

More particularly, the present invention relates to tamping materials for tamping a battery mix of the Leclanche-type and a manganese-alkaline dry battery composed mainly of an intermetallic compound of CoTi comprising 60 – 40 atomic % of Ti, preferably 48 – 52 atomic % of Ti, about 0.5 to 5 atomic % of Mo, and being Co. As a modified article of the present invention, less than 50%, of the cobalt atom is replaced by one or more of Ni, Cr, Fe, and/or less than 10%, preferably less than, 5% of the cobalt atom is replaced by one or more of Nb, Ta, W, Al, Zr, V, Mn, Be and Mg and/or less than 5%, preferably less than 2.5%, of the cobalt atom is replaced by one or more of elements from each of the platinum group and rare earth metals.

The materials of the present invention are very useful for the dry battery industry, particularly for tamping battery mix, when used as powder boxes, tamping molds, holders, sleeves push-bars, tips, stoppers, plates, screws, rods, bars, extrusion dies for small batteries, tablets, pin, and other parts of machines for production of packed powders.

DESCRIPTION OF THE PREFERRED EMBODIMENT

Reasons for limitations of the composition of the present invention are as follows:

The reason for limiting the molybdenum content to the range from about 0.5 to 5.0 atomic weight percent is that with less than about 0.5% the alloy does not possess superior erosion resistance while with more than about 5%, the ductility and, in turn, the plastic deformation and mechanical working properties of the alloy decrease.

The reason for limiting the titanium content to 40 – 60 atomic % in the present invention is that with less than 40 atomic % of Ti, a harmful and brittle intermetallic compound of $Co_2Ti$ is precipitated, while with more than 60 atomic % of Ti, a similarly brittle intermetallic compound of $CoTi_2$ is precipitated. These intermetallic compounds hinder hot workings and mechanical workings, such as, cutting and grinding.

The ductility of the inventive alloy composition is most excellent when the titanium content is 48 – 52 atomic %.

In the modified alloys of the present invention in which part of the cobalt atom is replaced by other elements, the replacement by one or more of Ni, Fe and Cr, or one or more of Fe and Cr, is effective for improving hot workability and castability. However, the reason for limiting the replacement to less than 50% of the cobalt atom is that when the replacement is more than 50%, the corrosion resistance and wear and erosion resistance against the Leclanche-type manganese-alkaline battery mix are lost, particularly at a temperature around 50° C.

When both machinability and good corrosion resistance are required, it is desired to limit the replacement to less than 85%, particularly when corrosion resistance at a temperature around 50° C is required, it is desired to limit the replacement to less than 65%.

The replacement of the cobalt atom by one or more of Nb, Ta, W, Al, Zr, V, Mn, Be and Mg is effective for improving the corrosion resistance, wear and erosion resistance. However, when the replacement is more than 10% of the cobalt atom, ductility is lost so that hot plastic workings and mechanical workings at room temperatures are difficult. Thus when ductility is particularly required, it is desired to limit the replacement less than 5%.

Further the replacement of the cobalt atom by one or more of elements of each of the platinum group (Rh, Pd, Os, Ir, Pt) and the rare earth metals (La, Ce, Pr, Nd, Sn, etc.) is effective for improving the corrosion resistance, particularly the corrosion resistance at high temperatures. Also, the effect is even greater when an element is selected from both groups rather than only one. However, when the replacement is more than 5% of the cobalt atom ductility is lost and hot plastic workings and various mechanical workings at room temperatures are difficult. When ductility is required particularly, it is desired to limit the replacement to less than 2.5%.

In the modification of the present alloys in which the cobalt atom is replaced by elements selected from the two groups of the above three replacing element groups, it is possible to expect an effect which is more than the sum of the effects of individual elements, namely, it is possible to obtain a synergistic effect. Particularly when the replacement is made by selecting the combination of Ni and Mo, the effect is remarkable, and it is preferable that the replacement by Ni is less than 50%, and the replacement by Mo is less than 3%.

The present invention will be more clearly understood from the following examples.

EXAMPLE 1

Test pieces of 30 × 30 × 5 mm prepared from various alloys shown in Table 1 were polished to No. 220 finish by emery papers, washed, dried and then immersed in trichlorethylene for about 2 minutes, fully degreased and dried in a dryer. Care was taken so that these test pieces were not touched by hand, and they were immersed in 100g of a Leclanche-type dry battery mix composed of manganese dioxide, graphite, ammonium chloride and zinc chloride, as shown in Table 1, contained in a lidded flask, and a corrosion test was carried out at room temperatures (20° C). Table 2 shows the surface conditions after the immersion tests. As clearly understood from Table 2, the binary alloys of CoTi of the present invention or their modified alloys in which part of the constituents are replaced by other elements show very excellent corrosion resistance.

Table 1

| Leclanche-type Dry Battery Mix | |
| --- | --- |
| Manganese Dioxide | 57% by weight |
| Graphite | 21% |
| Ammonium Chloride | 9% |
| Zinc Chloride | 1% |
| Water | 12% |

Table 2

Corrosion Resistance at Room Temperature (20° C) Against Leclanche-type Dry Battery Mix

| Test Pieces | Period of Immersion (Day) 10 | 30 | 50 | 100 |
| --- | --- | --- | --- | --- |
| SUS 27 (AISI 304) | x | x | x | x |
| Stellite No. 4 | o | o | Δ | x |
| Stellite No. 6 | x | x | x | x |
| Stellite No. 12 | Δ | x | x | x |
| $(Mo_{0.06}Co_{0.94})_{52}Ti_{48}$ | o | o | o | o |
| $(Mo_{0.06}Co_{0.94})_{48}Ti_{52}$ | o | o | o | o |
| $(Mo_{0.04}Zr_{0.02}Co_{0.94})_{52}Ti_{48}$ | o | o | o | o |
| $(Mo_{0.04}Zr_{0.02}Co_{0.94})_{48}Ti_{52}$ | o | o | o | o |
| $(Mo_{0.02}Co_{0.98})_{52}Ti_{48}$ | o | o | o | o |

Table 2-continued

Corrosion Resistance at Room Temperature (20° C) Against Leclanche-type Dry Battery Mix

| Test Pieces | Period of Immersion (Day) 10 | 30 | 50 | 100 |
| --- | --- | --- | --- | --- |
| $(Mo_{0.02}Co_{0.98})_{48}Ti_{52}$ | o | o | o | o |
| $(Mo_{0.02}Zr_{0.02}Co_{0.96})_{52}Ti_{48}$ | o | o | o | o |
| $(Mo_{0.02}Zr_{0.02}Co_{0.96})_{48}Ti_{52}$ | o | o | o | o |
| $(Ni_{0.50}Mo_{0.02}Co_{0.48})_{50}Ti_{50}$ | o | o | o | o |

Remarks:
o : indicates the test piece is completely sound and corrosion resistance is very good
Δ : indicates the test piece is tarnished by corrosion
x : indicates the test piece is severly attacked and impossible to use.

EXAMPLE 2

Test pieces of 30 × 30 × 5 mm were prepared in the same way as in Example 1 and they were immersed in about 100g of a Leclanche-type dry battery mix as shown in Table 1 contained in a lidded flask, and subjected to corrosion tests at high temperatures 40° C and 50° C. Table 3 shows the surface conditions after the immersion. It is understood from the results that the corrosion resistance at high temperatures is better at a lower replacement percentage, namely, at a higher cobalt content.

Table 3

Corrosion Resistance at High Temperatures

| Test Pieces | Immersion conditions | 40° C 1 days | 10 days | 20 days | 50° C 1 day | 10 days | 20 days |
| --- | --- | --- | --- | --- | --- | --- | --- |
| $(Ni_{0.48}Co_{0.50}Mo_{0.02})_{50}Ti_{50}$ | | o | o | o | o | o | o |
| $(Ni_{0.43}Co_{0.55}Mo_{0.02})_{50}Ti_{50}$ | | o | o | o | o | o | o |
| $(Ni_{0.38}Co_{0.60}Mo_{0.02})_{50}Ti_{50}$ | | o | o | o | o | o | o |
| $(Ni_{0.33}Co_{0.65}Mo_{0.02})_{50}Ti_{50}$ | | o | o | o | o | o | o |

Remarks:
o, Δ and x indicate the same as in Table 2.

EXAMPLE 3

Test pieces of 30 × 30 × 5 mm prepared in the same way as in Example 1 were immersed in about 100g of manganese-alkaline dry battery mix composed of manganese dioxide, caustic potash, graphite and others and contained in a lidded flask, and isothermal corrosion tests at room temperature (20° C) and at a high temperature (80° C) were carried out. Corrosion was determined by observing the surface conditions of the test pieces after the immersion. The results are shown in Table 4. It has been recognized that Stellite No. 4 which shows rather good corrosion resistance against the Leclanche-type dry battery mix is impossible to use in this case. Meanwhile the binary alloys of the present invention or the modified alloys in which part of the constituent elements is replaced by other elements show very excellent corrosion resistance.

Table 4

Corrosion Resistance against Manganese-Alkaline Dry Battery Mix

| Test Pieces | Immersion Conditions | Room Temperature (20° C) | | | | High Temperature (80° C) | | | |
| --- | --- | --- | --- | --- | --- | --- | --- | --- | --- |
| | | 1 day | 10 days | 20 days | 50 days | 1 day | 10 days | 20 days | 50 days |
| SUS 27 (AISI 304) | | o | Δ | x | x | Δ | x | x | x |
| Stellite No. 4 | | o | Δ | x | x | Δ | x | x | x |

Table 4-continued

| | | Corrosion Resistance against Manganese-Alkaline Dry Battery Mix | | | | | | | |
|---|---|---|---|---|---|---|---|---|---|
| | | Room Temperature (20° C) | | | | High Temperature (80° C) | | | |
| Test Pieces | Immersion Conditions | 1 day | 10 days | 20 days | 50 days | 1 day | 10 days | 20 days | 50 days |
| $(Ni_{0.50}Co_{0.48}Mo_{0.02})_{50}Ti_{50}$ | | o | o | o | o | o | o | o | o |

Remarks:
o, Δ and x indicate the same as in Table 2.

EXAMPLE 4

Test pieces of 30 × 30 × 4 mm were polished by emery paper to No. 1000 finish, washed, and degreased with trichlorethylene. These test pieces were subjected to wear resistance tests by a Spindel-type rapid wear testing machine with various loads and speeds, using quench-hardened bearing steel as a sliding ring. Some examples of the results are shown in FIG. 1. From these results it is clearly understood the inventive alloys show much better results than those of Hasteloy C alloy and Stellite alloy which have been said to have good wear resistance.

EXAMPLE 5

In order to determine the effects by compositions on hardness and erosion resistance, alloy compositions as shown in Table 5 were prepared. These alloys have a base structure of $Co_{50}Ti_{50}$ whose cobalt constituent is replaced partially by Ni and Mo. Hardness was measured by a Rockwell hardness tester and erosion was measured by a Staffer sand erosion tester. Estimation of erosion resistance was done by using the erosion resistance value R.

$$R = \frac{\text{Volume lost by erosion of standard material}}{\text{Volume lost by erosion of test piece}}$$

As the standard material, a case hardening carbon steel (AISI C-1015) ($H_v = 130$) was used. In general, a larger R value indicates a better erosion resistance. But as understood from Table 4, the present inventive alloys show high erosion resistance to its hardness as compared with the conventional alloys, and a higher titanium content shows increased hardness and a larger R value.

Table 5

| Effects on Erosion Resistance and Hardness by Compositions | | |
|---|---|---|
| Test Pieces | Hardness HR C | Erosion Resistance Value R |
| Stellite No. 12 | 51 | 3.4 |
| High Speed Steel (AISI T 1) | 63 | 2.5 |
| Nitriding Steel | 69 | 3.4 |
| $(Ni_{0.50}Mo_{0.01}Co_{0.49})_{50}Ti_{50}$ | 16.0 | 9.2 |
| $(Ni_{0.50}Mo_{0.02}Co_{0.48})_{50}Ti_{50}$ | 26.0 | 9.7 |
| $(Ni_{0.50}Mo_{0.03}Co_{0.47})_{50}Ti_{50}$ | 27.0 | 9.8 |
| $(Ni_{0.50}Mo_{0.04}Co_{0.46})_{50}Ti_{50}$ | 29.0 | 10.2 |

EXAMPLE 6

Bushes and push-bars prepared from the present inventive alloys and Stellite No. 4 alloy were subjected to utility testing by using them in the tamping of Leclanche-type dry battery mix by a UM-1 type tamping machine as shown in Table 1. The tamping conditions are:

| Tamping Pressure | 80 kg/cm² |
|---|---|
| Tamping Speed | 50 units/min. |

Their qualities were estimated by their serviceable periods as bushes and push-bars, and the results are shown in Table 6.

The serviceable life of the present inventive alloys as bushes are more than 2 times of that of Stellite No. 4, and the serviceable life of the present inventive alloys as push-bars is more than 5 times of that of Stellite No. 4.

Table 6

| Utility Tests by UM-1 type Tamping Machine for Tamping Leclanche-type Dry Battery Mix | | |
|---|---|---|
| Test Piece Part | Bush | Push-bar |
| Stellite No. 4 | 300 hrs. | 200 hrs. |
| Inventive Alloys | | |
| $(Ni_{0.50}Co_{0.48}Mo_{0.02})_{50}Ti_{50}$ | 750 | 1150 |
| $(Ni_{0.40}Co_{0.58}Mo_{0.02})_{50}Ti_{50}$ | 810 | 1200 |

EXAMPLE 7

To determine the hot workability of the present inventive alloys, test pieces of 40 mm diameter and 150 mm length were prepared by casting. These test pieces were pressed at 900° C in the lengthwise direction until cracking took place to determine upsettability. Further test pieces of 40 mm diameter and 150 mm length were hammered by a hammering machine at 900° C in the radial direction until cracking took place to determine forgeability. The results are shown in Table 7. It is recognized that the present inventive alloys show substantial plasticity which is not common for an intermetallic compound.

Table 7

| Hot Workability Tests | | |
|---|---|---|
| Test Piece | Test Upsettability | Forgeability |
| $(Ni_{0.50}Co_{0.48}Mo_{0.02})_{50}Ti_{50}$ | A | B |

Remarks:
Upsettability
A : upsettable at a compression rate of more than 30%
B : upsettable at a compression rate of about 10%
C : Not upsettable at all
Forgeability
B : forgeable at a forging rate of about 10%
C : not forgeable at all

What is claimed is:

1. A tamping device for use in the tamping of dry battery mix of the Lechanche-type and manganese alkaline type consisting of an alloy of CoTi composed of 60 – 40 atomic % of titanium, about 0.5 to 5 atomic % of molybdenum, the balance being Co, and having good corrosion resistance against Leclanche-type or manganese-alkaline dry battery mix.

2. The tamping device of claim 1 in which the alloy of CoTi further comprises about 48.0 to 52.0 atomic % of titanium.

3. A tamping device for use in the tamping of dry battery mix of the Lechanche-type and manganese alkaline type consisting of an alloy of CoTi composed of 60 – 40 atomic percent of titanium, about 0.5 to 5 atomic percent of molybdenum, the balance being cobalt and up to about 50% of the balance being an element selected from the group consisting of Fe, Cr, Ni and combinations thereof to improve corrosion resistance against Leclanche-type and manganese-alkaline dry battery mix at a temperature of about 50° C.

4. A tamping device for use in the tamping of dry battery mix of the Lechanche-type and manganese alkaline type consisting of an alloy of CoTi composed of 60 – 40 atomic percent of titanium, about 0.5 to 5 atomic percent of molybdenum, the balance being cobalt and up to about 5% of the balance being an element selected from the group consisting of elements of the platinum group, the rare earth elements and combinations thereof.

5. A tamping device for use in the tamping of dry battery mix of the Lechanche-type and manganese alkaline type consisting of an alloy of CoTi composed of 60 – 40 atomic percent of titanium, about 0.5 to 5 atomic percent of molybdenum, the balance being cobalt and up to about 2.5% of the balance being an element selected from the group consisting of elements of the platinum group, the rare earth elements and combinations thereof.

6. A tamping device for use in the tamping of dry battery mix of the Lechanche-type and manganese alkaline type consisting of an alloy of CoTi composed of 60 – 40 atomic percent of titanium, about 0.5 to 3 atomic percent of molybdenum, the balance being cobalt and up to about 50% of the balance being Ni.

* * * * *